US006191701B1

(12) United States Patent
Bruwer

(10) Patent No.: US 6,191,701 B1
(45) **Date of Patent: *Feb. 20, 2001**

(54) SECURE SELF LEARNING SYSTEM

(75) Inventor: Frederick Johannes Bruwer, Montana (ZA)

(73) Assignee: Microchip Technology Incorporated, Chandler, AZ (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/519,612

(22) Filed: Aug. 25, 1995

(51) Int. Cl.[7] ........ H04Q 1/00

(52) U.S. Cl. ........ 340/825.3; 340/825.31; 340/825.69

(58) Field of Search ........ 340/825.3, 825.31, 340/825.34, 825.56; 380/45, 30, 21, 283, 284, 285; 361/172; 235/380

(56) References Cited

U.S. PATENT DOCUMENTS

| | | | | |
|---|---|---|---|---|
| Re. 29,525 | | 1/1978 | Willmott . | |
| 4,380,762 | | 4/1983 | Capasso . | |
| 4,385,296 | | 5/1983 | Tsubaki et al. . | |
| 4,426,637 | | 1/1984 | Apple et al. . | |
| 4,529,960 | | 7/1985 | Liotine et al. . | |
| 4,535,333 | | 8/1985 | Twardowski . | |
| 4,574,247 | | 3/1986 | Jacob . | |
| 4,590,470 | | 5/1986 | Koenig . | |
| 4,596,985 | | 6/1986 | Bongard et al. . | |
| 4,638,433 | | 1/1987 | Schindler . | |
| 4,652,860 | | 3/1987 | Weishaupt et al. . | |
| 4,686,529 | | 8/1987 | Kleefeldt . | |
| 4,723,121 | | 2/1988 | Van Den Boom et al. . | |
| 4,737,770 | | 4/1988 | Brunius et al. . | |
| 4,750,118 | | 6/1988 | Heitschel et al. . | |
| 4,779,090 | | 10/1988 | Micznik et al. . | |
| 4,835,407 | | 5/1989 | Kataoka et al. . | |
| 4,847,614 | | 7/1989 | Keller . | |
| 4,855,713 | | 8/1989 | Brunius . | |
| 4,864,615 | * | 9/1989 | Bennett et al. | 380/21 |
| 4,878,052 | | 10/1989 | Schulze . | |
| 4,881,148 | * | 11/1989 | Lambropoulos et al. | 361/172 |
| 4,890,108 | | 12/1989 | Drori et al. . | |
| 4,912,463 | | 3/1990 | Li . | |
| 4,928,098 | | 5/1990 | Dannhaeuser . | |
| 4,931,789 | | 6/1990 | Pinnow . | |
| 4,951,029 | | 8/1990 | Severson . | |
| 4,951,247 | * | 8/1990 | Kruse et al. | 235/380 |
| 4,988,992 | | 1/1991 | Heitschel et al. . | |
| 5,049,867 | | 9/1991 | Stouffer . | |
| 5,055,701 | | 10/1991 | Takeuchi . | |
| 5,103,221 | | 4/1992 | Memmola . | |
| 5,107,258 | * | 4/1992 | Soum | 340/825.31 |
| 5,144,667 | * | 9/1992 | Pogue, Jr. et al. | 380/45 |
| 5,148,159 | | 9/1992 | Clark et al. . | |
| 5,191,610 | | 3/1993 | Hill et al. . | |
| 5,224,163 | * | 6/1993 | Gasser et al. | 380/30 |
| 5,365,225 | * | 11/1994 | Bachhuber | 340/825.31 |

FOREIGN PATENT DOCUMENTS

| | | | |
|---|---|---|---|
| 0 244 332 | | 11/1987 | (EP) . |
| 0 311 112 | * | 4/1989 | (EP) . |
| 0 459 781 | | 12/1991 | (EP) . |

* cited by examiner

*Primary Examiner*—Edwin C. Holloway, III
(74) *Attorney, Agent, or Firm*—Ari O. Pramudji; Frohwitter

(57) ABSTRACT

A method and system for the remote control of devices having a secure self learn capability. The system includes an encoder and a decoder, the encoder encoding variable information including a user key using a non-linear algorithm to produce an encoded value transmitted to the decoder, the decoder decoding the value using the same algorithm. In a learning mode a new encoder is to be added to the system. The new encoder produces an encoded value using a key generation seed. The decoder, upon receiving the encoded key generation seed, produces a decoding key based upon the decoded key generation seed. The decoding key is stored in the decoder memory allowing valid recognition of the new encoder in a secure manner.

36 Claims, 6 Drawing Sheets

SECURE SELF LEARNING SYSTEM

BACKGROUND OF THE INVENTION

1. Field of the Invention

The present invention relates to a secure self learning system and method and, in particular, to a secure self learning system and method for remotely controlling systems and devices in security systems.

2. Discussion of the Background

The remote control of systems or devices via ultrasonic, radio frequency or infra red transducers is popular for many applications, including security systems for buildings and vehicles, and remote controlled garage door and gate openers.

Certain unidirectional transmission systems currently in use have two very important security shortcomings:

(a) the codes they transmit are usually fixed; and (b) the number of possible code combinations is relatively small. Either of these shortcomings can lead to unauthorized access.

The limited number of possible combinations available in most remote control systems makes it possible to transmit all possible combinations in a relatively short time. A hand held microprocessor-based system for this purpose (called a code scanner) can easily be constructed.

In systems using eight DIP switches (256 combinations), this scanning process can typically be accomplished in less than 32 seconds, when trying eight combinations per second. Even in systems using 16 bit keys, yielding 65,536 combinations, only 2¼ hours would be required to try all possible combinations. It should also be noted that the scanner may gain access in far less than this maximum time—the average time would in fact be half of the total time.

An easier way of gaining unauthorized access to a security system is freely available. A unit of this type is advertised as a tool for the "legal repossession of vehicles".

A remote control transmitter of the type normally used in vehicle security and remote control systems includes a small radio transmitter that transmits a code number on a specific frequency. This code number is normally generated by an integrated circuit encoder. The transmission frequency is usually fixed by legislation within a particular country. Thus it is possible to build a receiver that can receive signals from all such transmitters and to use this together with a circuit which records the transmissions captured by the receiver. Such a device is known as a code or key grabber and can be used to gain access to protected premises or to vehicles with remote control security systems.

Code hopping and rolling code systems are currently available to overcome the limitations of fixed code systems (refer to ZA Patent No. 91/4063 and U.S. Pat. No. 5,103,221). The specifications of these patents describe transmitters which use algorithms to generate a different transmission each time the transmitter is activated. When a code is received and decoded, a decoder responds only if a valid transmission was made. In some cases (refer to ZA Patent No. 91/4063) a special algorithm is used with a stored key to decode an encoded reception. The decoded value is then compared to a stored value to determine if the transmission is legitimate or not.

A disadvantage of code hopping and rolling code systems is the fact that it is difficult to replace or disable lost, stolen or unserviceable transmitters. External equipment is used by a manufacturer or dealer to reprogram and replace a transmitter. An additional security problem may be created during this process.

Ideally a security system should not require dealer intervention when a user needs to add a new transmitter to the system or replace a transmitter. The user should be able to buy a generic replacement transmitter off the shelf and add this transmitter unassisted when convenient. Learning systems provide this capability, in that the decoder can "learn" the new transmitter's identity without having to be reprogrammed from outside using special equipment.

A learning system should however not only enable a user to add a new transmitter to the system, but should also have a means of excluding a previous transmitter from the system, due to the possibility of such a transmitter failing into the wrong hands.

In self learning fixed code systems, the incoming code is stored for future reference by the decoder when it is in a learning mode. Subsequent transmissions are compared with the learned code. Different arrangements to learn new transmitter codes are used. A switch can be used to set the decoder either in a normal operation mode or in a learning mode (U.S. Pat. Nos. 4,750,118 and 4,912,463). In the learning mode, the decoder can learn new valid codes from a transmitter. Similar means is used (refer to U.S. Pat. Nos. 4,931,789 and 5,049,867) to program the decoders to react to a new transmitter code. In another invention (refer to U.S. Pat. No. 5,148,159), a randomly selected fixed code is generated by the decoder and programmed into the associated transmitter. U.S. Pat. No. 4,855,713 describes the use of a hand held programmer to program the new fixed code to be recognized by the decoder. In all of these cases, the transmitted or programmed codes are fixed stored codes. Security threats by means of code grabbing or code generation still exist irrespective of the learning mechanisms employed.

Reference should also be made to the specifications of the following U.S. Pat. Nos: Re 29,525; 4,380,762; 4,385,296; 4,426,637; 4,529,980; 4,534,333; 4,574,247; 4,590,470; 4,596,985; 4,638,433; 4,652,860; 4,686,529; 4,737,770; 4,779,090; 4,835,407; 4,847,614; 4,855,713; 4,878,052; 4,890,108; 4,928,098; 4,951,029; 4,988,992; 5,049,867; 5,055,701.

SUMMARY OF THE INVENTION

The invention provides, in the first instance, a method of operating an encoder which includes the steps of:

- storing a serial number;
- storing at least one of the following:
  - a seed; and
  - a key which is generated using a manufacturer's master key and at least one of the following:
    - the seed; and
    - the serial number; and
- transferring key generation information selected at least from:
  - the seed;
  - the serial number; and
  - information derived from applying the key and an algorithm to an input value.

The input value may include information selected at least from:

- a management code;
- a counter value; and
- information relating to a command.

In one embodiment the method includes the steps of:

- storing a plurality of parameter sets, each parameter set including information selected at least from:
  - a respective serial number;

a respective seed;

a respective key; and respective information derived from applying the said respective key and the algorithm to a respective input value;

selecting a parameter set; and transferring the respective key generation information for the selected parameter set.

Each input value may include information selected at least from:

a respective management code;

a respective counter value; and information relating to a command.

The encoder may also include provisions for disabling the transmission of key generation information. This facility is useful to prevent an outsider from obtaining the key generation information after the transmitter has been learned by a decoder. The transmission of key generation information can be permanently disabled by a conscious action by the user, or by an automatic process, e.g. when the encoder has been used a predetermined number of times. In the former case manual action can be taken by using a programming action or a specific combination of inputs.

The invention also extends to a method of operating a decoder which includes the steps of:

storing a manufacturer's masterkey;

receiving a signal which contains key generation information selected at least from:

a seed;

a serial number; and encoded information derived from applying a first key and an algorithm to an input value; and generating a second key using at least the key generation information and the manufacturer's master key.

The method may include the steps of storing at least one of:

the second key;

the key generation information; and the serial number.

In one embodiment the received signal includes the encoded information and the method includes the steps of:

decoding the encoded information using a decoding algorithm and a previously generated second key to obtain a decoded input value which includes information selected at least from:

a management code;

a counter value; and information relating to a command; and storing the decoded input value.

The method may include the steps of:

storing a plurality of parameter sets, each parameter set including information selected at least from:

a respective serial number;

a respective management code; and a respective counter value.

In a further embodiment, the key generation information includes a portion that may be used in the decoder to modify or augment the stored manufacturer's key during learning.

The invention further extends to a method of operating an access control system which includes an encoder and a decoder, the method including the steps of:

storing a serial number;

storing at least one of the following:

a seed; and a first key which is generated using a manufacturer's master key and at least one of the following:

the seed; and the serial number; and using the encoder to transfer a signal which includes key generation information selected at least from:

the seed;

the serial number; and information derived from applying the first key and an algorithm to an input value; and, at the decoder, storing a manufacturer's master key;

receiving the transferred signal; and generating a second key using at least the key generation information and the manufacturer's master key.

During learning, the key generation information may be used to modify or augment the manufacturer's key stored in the decoder. Alternatively, a decoder may not have a manufacturer's key at all, and may derive the decoding key solely from the key generation information transmitted by the encoder, or use that key generation information directly as a decoding key.

The second key or the key generation information may be stored. In the former case, the method includes the steps of:

activating the encoder with a command;

encoding at least an input value using the first key and an algorithm to form an encoded part, the input value including information selected at least from:

a counter value;

a management code; and information relating to the command;

using the encoder to transfer a signal which is formed from at least the serial number and the encoded part; and, at the decoder, receiving the transferred signal; and using the second key and a decoding algorithm to decode the said encoded part in the transferred signal to obtain the said input value.

In the latter case the method includes the steps of:

activating the encoder with a command;

encoding at least an input value using the first key and an algorithm to form an encoded part, the input value including formation selected at least from:

a counter value;

a management code; and information relating to the command;

using the encoder to transfer a signal which is formed from at least the serial number and the encoded part; and, at the decoder, receiving the transferred signal; and using the key generation information and a decoding algorithm to decode the said encoded part in the transferred signal to obtain the said input value.

The method may further include the steps of:

at the encoder, storing a plurality of parameter sets, each parameter set including information selected at least from:

a respective serial number;

a respective seed; and respective information derived from applying the said respective key and the algorithm to a respective input value;

selecting a parameter set;

activating the encoder using a command;

transferring a signal which contains the key generation information associated with a selected parameter set; and, at the decoder, storing a plurality of parameter sets, each parameter set including information selected at least from:

a respective serial number;

a respective management code; and a respective counter value;

receiving the said transferred signal, and generating a respective second key, associated with a selected parameter set, using the manufacturer's master key and the key generation information contained in the said transferred signal.

Preferably the encoder and the decoder are each formed in a respective microchip.

The invention also provides an encoder which includes:

means for storing a serial number;

means for storing at least one of the following:

seed; and a key which is generated using a manufacturer's master key and at least one of the following:

the seed; and the serial number; and means for transferring key generation information selected at least from:

the seed;

the serial number; and information derived from applying the key and an algorithm to an input value.

The encoder may include means for storing a plurality of parameter sets, each parameter set including information selected at least from:

a respective serial number;

a respective seed;

a respective key; and respective information derived from applying the said respective key and the algorithm to a respective input value; and means for selecting a parameter set;

the said transferring means being adapted to transfer the respective key generation information for the selected parameter set.

The invention also extends to a decoder which includes:

means for storing a manufacturer's master key;

means for receiving a signal which contains key generation information selected at least from:

a seed;

a serial number; and encoded information derived from applying a first key and an algorithm to an input value; and means for generating a second key using at least the key generation information and the manufacturer's master key.

Means may be provided for storing at least one of:

the second key;

the key generation information; and the serial number.

During learning, the key generation information may be used to modify or augment the manufacturer's key stored in the decoder. Alternatively, the decoder may not have a manufacturer's key at all, and may derive the decoding key solely from the key generation information transmitted by the encoder, or use that key generation information directly as a decoding key.

The invention further provides an access control system which includes an encoder and a decoder, the encoder including:

means for storing a serial number;

means for storing at least one of the following:

a seed; and a first key which is generated using a manufacturer's master key and at least one of the following:

the seed; and the serial number; and means for transferring a signal which includes key generation information selected at least from:

the seed;

the serial number; and information derived from applying the first key and an algorithm to an input value;

the decoder including:

means for storing a manufacturer's master key;

means for receiving the transferred signal; and means for generating a second key using at least the key generation information and the manufacturer's master key.

The system may include means for storing the second key or the key generation information.

In the former case the system may include:

means for activating the encoder with a command;

means for encoding at least an input value using the first key and an algorithm to form an encoded part, the input value including information selected at least from:

a counter value;

a management code; and information relating to the command;

means for forming a signal, for transfer by the encoder, from at least the serial number and the encoded part;

the decoder including means for using the second key and a decoding algorithm to decode the said encoded part in the transferred signal, received by the said signal receiving means, to obtain the said input value.

In the latter case the system may include:

means for activating the encoder with a command;

means for encoding at least an input value using the first key and an algorithm to form an encoded part, the input value including information selected at least from:

a counter value;

a management code; and information relating to the command;

means for forming a signal, for transfer by the encoder, from at least the serial number and the encoded part;

the decoder including means for using the key generation information and a decoding algorithm to decode the said encoded part in the transferred signal, received by the said signal receiving means, to obtain the said input value.

The system may include means for storing a plurality of parameter sets at the encoder, each parameter set including information selected at least from:

a respective serial number;

a respective seed; and respective information derived from applying the said respective key and the algorithm to a respective input value;

means for selecting a parameter set;

means for activating the encoder using a command;

the signal transferring means then transferring a signal which contains the key generation information associated with a selected parameter set;

means for storing a plurality of parameter sets at the decoder, each parameter set including information selected at least from:

a respective serial number;

a respective management code; and a respective counter value; and means for generating a respective second key, associated with a selected parameter set, using the key generation information contained in the said transferred signal.

The said respective second key may be generated using the said key generation information and the manufacturer's key.

It is to be understood that, during learning, the key generation information may be used to modify or augment the manufacturer's key stored in the decoder. Alternatively, the decoder may not have a manufacturer's key at all, and may derive the decoding key solely from the key generation information transmitted by the encoder, or use that key generation information directly as a decoding key.

Preferably the encoder and the decoder are each formed in a respective microchip.

It is an object of the present invention to provide an access control system wherein a transmitter or token, such as a so-called "smart card", may be replaced or added to the system by a user without external equipment and without transferring an encoding key in clear format, i.e., in unencoded form.

The access control system may allow for the disabling, in a decoder, of stolen transmitter codes to prevent unauthorized access to the system.

Another object of the invention is to provide an access control system which acts against the use of code grabbing or scanning methods.

The invention is further concerned with an encoder and a decoder for use in an access control system, and with their method of operation.

During the manufacturing process, encoders are programmed with different serial numbers associated with a range of decoders. A unique manufacturer's master key is used together with an algorithm and the serial number, to generate and store a user key in a non-volatile memory of the encoder, together with counter, management code and other information. Several sets of these parameters can be stored to handle several transmissions (transmit different commands by activating different inputs). The manufacturer's master key is also stored in all the manufacturer's decoders. User data and control data is also programmed to control the different functions that need to be activated by the encoder. The same algorithm used to generate the user key in the encoder must also be present in the decoder.

In normal operation of an encoder, the key information associated with a parameter set is used to encode the variable counter information, together with the encoder management code, serial number and other information by making use of a special algorithm. The information that is encoded will be different each time the encoder is activated. This technique is referred to as code hopping. Although it is known that the counter information changes, the transmission is not predictable because of the secret key and algorithm that encode the information. In an access control system, a fixed part denoting the serial number may be generated with the code hopping part and together form a transmission value that is transmitted by a data transfer interface.

In one embodiment of the invention, an encoder learning capability is implemented. This allows a user to replace an encoder or add an encoder to be recognized by a decoder which has a learning mode function, selectable by the user. The learning mode function can be selected by activating it on the decoder. This can be accomplished by using a normal encoder and programming the output function to set the decoder in learning mode. This is also known as a master encoder or token. The use of such a master encoder allows for a higher level of security to be achieved. The master token may also be used in conjunction with input switches.

In a different embodiment of the invention, it is possible for an encoder to encode an external input value. This input value replaces the value to be encoded internally by the encoder. A bidirectional communication arrangement is used in this case. This procedure can be used to identify the originality of the encoder, known as identification friend or foe (IFF), for access control and authentication purposes. The encoder accepts a challenge value as an input from a terminal that forms part of an access control system. This input value is encoded by the encoder using the encoding function and key to form an encoded value. The encoded value is then transferred to the decoder that is part of an access control terminal. If a legitimate encoder is used, the encoded value will correspond with a decoded value calculated by the decoder and the decoder will enable an external function to operate. If it is not a legitimate encoder, the decoded value will not correspond with the value generated by the decoder, preventing the required response by the decoder.

The encoder can be used in a token or a transmitter type device in an access control system. A transmitter would generally, on activation, transfer information from the encoder output to a receiver system via a transfer medium such as radio (rf), infra red (ir) or microwave. A token can also designate a transmitter device, but more generally includes a device in which information transfer is done by means of electrical contacts and conductors. In these physical contact tokens (or smart cards), information can be transferred bi-directionally through read and write operations. In both cases the invention is directed to the transfer of information regarding the encoding or decoding key without possibly exposing the encoding or decoding key to the outside world.

Once the learning mode of the decoder is selected, the data from the new encoder is captured and the serial number is first used. By making use of the manufacturer's master key and the captured encoder serial number, a new decoder key is derived with the key generation algorithm that must form part of the decoder. The key generation information may be used to modify or augment the manufacturer's key before the new key is calculated. Alternatively, the decoder may not have a manufacturer's key at all, and may derive the decoding key solely from the key generation information transmitted by the encoder, or use that key generation information directly as a decoding key. The newly derived key is used to decode the variable (encoded) part of the previously captured transmission. Once decoded, it is checked to verify that the correct key was generated and used.

In a different embodiment, a further transmission can be required to be decoded. This double transmission system can then also check the decoded counter information to ensure that the generated key is valid. The encoder serial number is stored in non-volatile memory, and associated with it, the derived decoder key, management code, counter and other user information. The learning is thus verified before it is accepted as valid, after which the encoder can be used to activate the decoder in normal operation.

In normal operation, the encoder, when activated through electrical inputs, for example by depressing a push button switch, or switches, or by any other suitable command means, encodes the counter, button and management code information with an algorithm and a key. The management code information usually consists of information selected from the following group: the encoder status, command, identity, technology type, time, mode, integrity and user data. It may also include time information. This time information may be used to transfer the time that the encoding event took place or to indicate valid periods or expiry dates to the decoder system. The user key is associated with the serial number that forms part of the information that is stored in non-volatile memory. The unencoded serial number and the encoded information are transferred by external data transferring means. The data transfer can be a transmission by an encoder, or the encoder can be activated electrically in a specific application to transfer the data.

The decoder, on receipt of the transmission, detects the unencoded serial number and encoded part. It compares the serial number with the serial numbers of the learned encoders stored in its memory. If no comparison is found, the transmission is rejected. If a matching value is found, the decoder key stored in memory associated with the matching serial number is used to decode the encoded information with a decoding algorithm. The integrity of the transmission is checked to verify that the signal was received and decoded correctly. If this is valid, the counter is checked. If valid, the decoder counter information is updated and the output function control is activated. If the counter is not valid, the transmission is rejected.

The advantages of the security system are that the transmissions always differ without intervention from the user and that the learning process is conducted in a secure fashion. The learning decoder must be accessible and available and information regarding the manufacturer's master key must be available in the decoder.

In a different embodiment, an even more secure learning process is implemented. Using an algorithm and a manufacturer's master key together with a unique key generation seed chosen for each encoder, an encoder key is generated. The key generation seed and user key are programmed into every encoder along with the encoder serial number and management code information. The key generation algorithm and manufacturer's master key need not preside in any encoder. No mathematical link need or should exist between encoder serial numbers and key generation seeds. When learning a decoder with a new encoder, the encoder is put into learning mode and the key generation seed and serial number are transferred to the decoder. The decoder generates a key for this encoder, using the manufacturer's master key, key generation seed and key generation algorithm. As the key generation seed is only transmitted during the learning process, unauthorized access, under normal operation, is not possible.

In a further embodiment of the more secure learning process, a unique manufacturer's key for each transmitter can be used for the calculation of the key for that transmitter. All decoders do not therefore have to contain a complete manufacturer's key. During learning, the manufacturer's key related to the particular encoder is derived from the key generation information received from that encoder. The manufacturer's key can be derived by modifying or augmenting a stored complete or partial manufacturer's key, or by using the incoming key generation information exclusively to determine the manufacturer's key.

The decoder then calculates the encoder's key, using the modified or augmented manufacturer's key and one or more of the following: the encoder's serial number; the same key generation information used for the determination of the manufacturer's key; and further key generation information obtained from a further transmission.

The remainder of the learning procedure is identical to the described procedures.

In yet another embodiment of the more secure learning process, the encoder's unique key can be derived without further stored or secret information, but from information transmitted as a learning seed. In this embodiment, no manufacturer's key is required in the decoder.

In any or all of these embodiments, the encoder can be designed to allow transmission of the key generation information to be disabled permanently after the learning process has been completed. The disabling action can be executed by a specific input command, through a programming action or automatically. Automatic processes may include counting the number of activations of the transmitter and disabling transmission of the key generation information after one activation or a predetermined number of activations.

A verification process is initialized to verify that the correct key has been generated and that other encoder information has been stored. On completion, the encoder is now a valid encoder. This verification process also ensures that rogue encoders or transmitters from other manufacturers that do not have the correct manufacturer's master key cannot be learned.

The use of a key generator seed protects the security of the system in the event of unauthorized scanning for the serial number of an encoder. With the known serial number, it is very unlikely, but possible, that an encoder can be forged if access is gained to the manufacturer's equipment and the manufacturer's master key. If a key generator seed is used, however, the key that is stored in the decoder cannot be generated without having access to the owner's transmitter or token as well.

After the learning operation has been successfully executed and the decoder has returned to the normal operating mode, the encoder can be used to activate the decoder in the normal way. This means the serial number will again be compared against learned systems. Special baud rate compensation circuitry can be used during the reception process to allow reliable code reception. The stored key associated with the encoder serial number is used to decode the transmission. The integrity of the received and decoded transmission is checked for validity by comparing the management code information received and decoded from the encoder with the stored information. A similar process is carried out on the associated counter information. If successful, the counter information is updated and the predetermined output signal is selected, resulting in the correct external function being activated.

To prevent an intruder from grabbing key information and compromising a security system, the key information should never be transmitted. Code hopping makes it impossible for an intruder to gain unauthorized access to the decoder or the learning capability of the decoder by using code grabbing or generation, or by initializing an unauthorized code hopping encoder.

The described system makes use of stored keys in the decoder to decode incoming transmissions. An alternative arrangement for a learning system is to store only the key generation seed, instead of the full key, in the decoder's key location. During decoding operations, the correct key is generated from a selection of the associated seed, serial number and manufacturer's master key. The advantage is that less nonvolatile storage space is required, as the key generation seed may require less storage space than the key. The correct key is generated in RAM whenever needed. Since several encoders can be learned to a single decoder and the RAM can be used over and over, this implementation can be economical.

This invention can be used in different configurations to enable a manufacturer to utilize its principles, for example, in a vehicle security system, door or gate remote control security system or in a system to control personnel access to a security area. Different kinds of transmission media can also be used, for instance radio, infra red or a physical wire connection.

BRIEF DESCRIPTION OF THE DRAWINGS

The invention is further described by way of example with reference to the accompanying drawings in which.

DESCRIPTION OF THE PREFERRED EMBODIMENT

The invention is described hereinafter firstly in a general sense, with reference to FIG. 1, in order to illustrate the principles of the invention and thereafter, with reference to FIGS. 2 to 5, in a more detailed manner which is related to a practical embodiment of the invention.

Simplified Description

Figure 1:
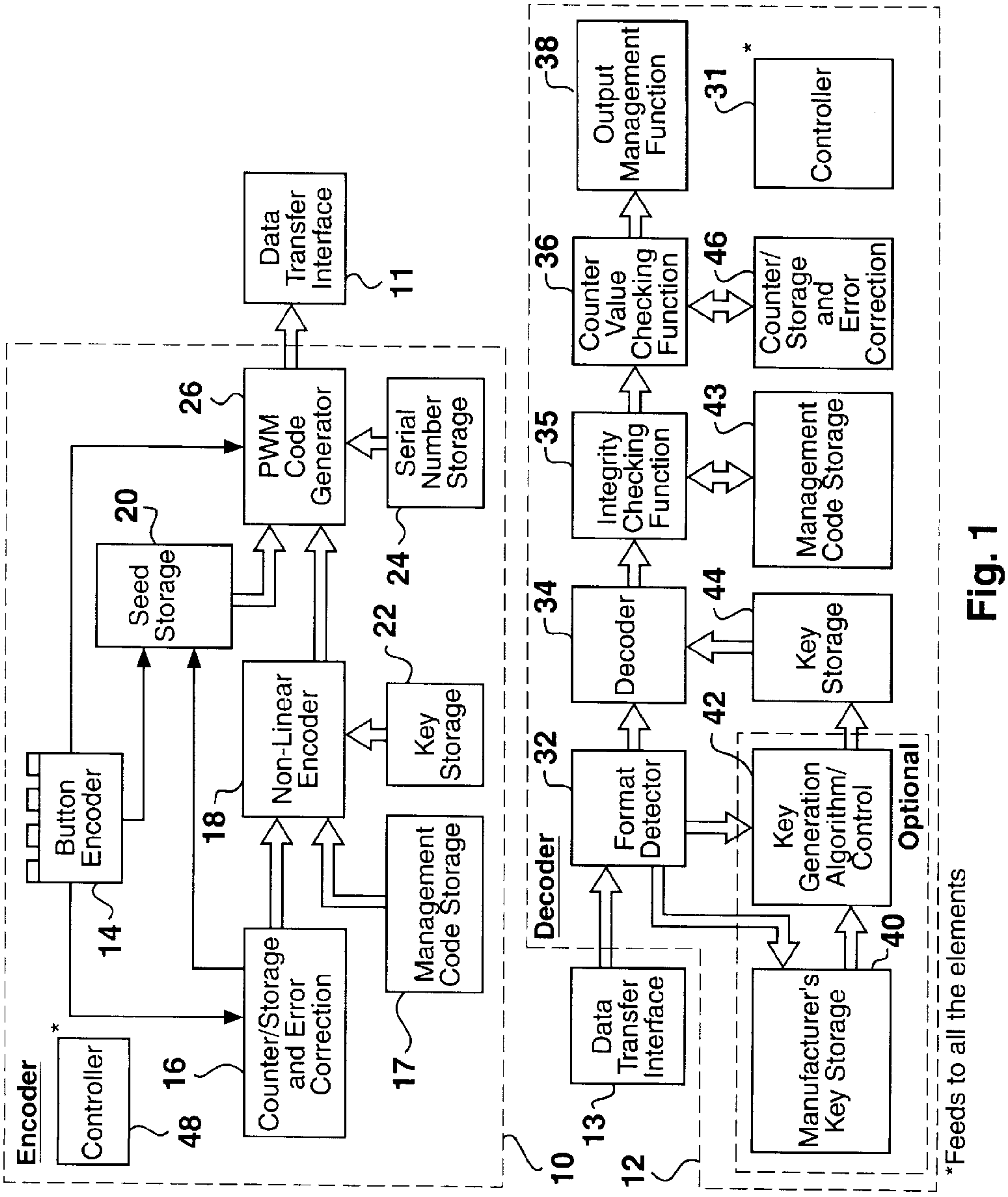
FIG. 1 is a simplified representation in block diagram form of an encoder and data transfer interface, and a decoder and data transfer interface in an access control system according to the invention.

FIG. 1 is a simplified block diagram of a transmitter comprising an encoder 10 and a data transfer interface 11, and a receiver comprising a decoder 12 and a data transfer interface 13 used in a code hopping remote control system. Sophisticated functions and multiple encoder/decoder combinations have been omitted only for the sake of clarity.

The invention is primarily concerned with the implementation of learning in a code hopping system. Learning has been implemented in standard fixed code systems, but code hopping systems present a unique challenge. Information encoded by the encoder cannot be decoded unless one has access to a user key and the encoded information can consequently not be used to transmit the key to the decoder. The invention is directed to overcoming this problem.

The encoder includes a button encoder 14, a counter/storage and error correction 16, management code storage 17, a non-linear encoder 18 having an encoding algorithm, storage 20 for a key generation seed, storage 22 for a user key, storage 24 for a serial number associated with the encoder, and a pulse width modulated code generator 26.

The decoder 12 consists of a controller 31, a format detector 32, a decoder 34 having a decoding algorithm, an integrity checking part 35, a counter value (synchronization) checking unit 36, an output management function 38, counter/storage 40 for a manufacturer's master key, a key generating unit 42, storage 43 for a management code, storage 44 for a decoder key, and storage and error correction 46 for counter information.

The button encoder 14 is responsive to a plurality of buttons 48 which are manually actuable. When a button is actuated the encoder 10, as a whole, is activated. The encoder may function in any one of a plurality of modes, as will become apparent from the following description, with the encoder operating mode being determined by the button or combination of buttons which are actuated. The encoder functions are controlled by a controller 49.

The controller part 49 of the encoder controls the encoder operation. The control part 49 is connected to each part of the encoder and senses the operational state of each part and provides operational control signals to each part to control the operation and functioning of the encoder as a whole. Encoder commands are received from the external buttons and used to initiate operational control signals to the rest of the encoder. Control signals can consist of encoder mode changes, selection of transmission information and activation of all the different parts as necessary.

The controller 31 of the decoder controls the decoder in a similar fashion as the encoder control part 49 controls the encoder. The control part 31 is connected to each decoder part. It senses the operational state of each part of the decoder and provides operational control signals to each part to control the operation and functioning of the decoder as a whole from the decoder commands that are received from the format detector and mode select input signals. Control signals can consist of decoder mode changes, selection of key generation, storage of information, such as keys and serial numbers, integrity checking, synchronization and counter value storage, and output signals.

The controller 49 may function in either of two modes, namely a learning mode or a normal operating encoding mode. Each mode may be selected, as has been indicated, by an appropriate choice of the buttons 48, or in any other suitable way specific to the application arrangement of the encoder. Once a command has been entered by the button encoding part 14, control signals are issued by the control part 49. In the normal operating mode, control signals are issued to operate the counter/storage and error correction part 16, management code storage 17, non-linear encoder 18, key storage 22, serial number storage 24 and PWM code generator 26 to select and activate the appropriate output of each specific part. This ensures that the encoder will function as described more specifically below.

If the encoder is used in learning mode, the control part 49 issues control signals to the seed storage 20, serial number storage 24 and PWM code generator 26 to select and activate the appropriate output of each specific part. This ensures that the encoder will function as described more specifically below.

The controller 31 of the decoder may function in either of two modes, namely a learning mode and a normal operating encoding mode. The mode may be selected by appropriate internal or external circuitry. Internal circuitry can be activated by the normal detecting and decoding operation as described below, to put the decoder in a learning mode. External circuitry, such as a push button 110 or other switching means, can be used as well.

In normal operation mode, once the decoder has detected a received signal using the format detector 32, the controller 31 decides on the control signals to operate the decoder. Control signals are issued to the key generation algorithm/control 42, key storage 44, decoder 34, management storage 43, integrity checking 35, counter/storage and error correction 46, counter value checking 36 and output management 38 to select and activate the appropriate output of each specific part. This ensures that the encoder will function as described more specifically below.

If the decoder is used in learning mode, the controller 31 issues commands to the key generation algorithm/control 42, key storage 44, decoder 34, management storage 43, integrity checking 35, counter/storage and error correction 46, output management 38 and learning control 100. This ensures that the decoder will store the appropriate information and function as described more specifically below.

In the normal operating mode the counter/storage and error correction 16 is activated each time the encoder 10 is used. Its count is therefore indicative of the number of times the encoder is used. The counter value is stored in non-volatile memory. The memory only operates when power is supplied to the encoder. If the counter value is changed and the power disconnected at the same time, it can cause spurious values to be stored. For this reason an error correction function is included in the counter/storage and error correction 16. The counter information is encoded in the non-linear encoder 18 using the user key in the storage 22. The output of the encoder 18 thus comprises variable information which is combined in the generator 26 with the serial number from the storage 24. The serial number, as has been noted, is associated with the encoder. The output of the generator 26 is applied to the data transfer interface 11 and transmitted to the data transfer interface 13 and decoder 12. The serial number can also form part of a unit number uniquely to identify an encoder unit.

It is to be noted that the encoder and the decoder may be directly connected, for example by means of a wire, or the encoder and decoder may be remote from one another and the transmission of information may be done by radio signal, optically, at an infra-red frequency or in any other suitable way.

The signal which is received by the decoder 12 using the data transfer interface 13 is converted to a logic signal which, in turn, is converted by the format detector 32, to a number which is applied to the decoder 34. The detector may be a pulse width modulation code detector. The decoding algorithm of decoder 34 decodes the variable portion of the number yielding counter and management code information, the integrity of which is checked by the part 35 using management code information in the storage 45, to verify the validity of the decoding operation. If it is valid, the unit 36 compares the decoded counter information with counter information held in the storage 46 to determine that the decoded number is valid and has not been used before. If the reception is valid then the relevant outputs are activated by the output management function 38.

In order to implement learning the user places the decoder 12 in a learning mode. The encoder 10 is also effectively placed in a learning mode by activation of the appropriate buttons 48. In this case the key generation seed held in the storage 20 is applied together with the serial number in the storage 24 to the generator 26. It is to be noted that the key generation seed is only used during the learning operation. The whole operation of the decoder is controlled by the controller 31.

The data transfer interface 11 thus transmits information on the key generation seed and the serial number to the decoder 12. The data transfer interface 13 receives this information which is then detected by the detector 32 and passed to the key generation unit 42. This unit calculates a decoder key based on the incoming key generation seed and the manufacturer's master key which is held in the storage 40. The newly generated decoder key is stored in the location 44 and can be used for any future decoding operations, acting on the decoding algorithm of decoder 34.

The key generation algorithm that is used in key generation unit 42 during the secure learning operation is usually a non-linear algorithm. This algorithm accepts as input the manufacturer's master key 40 (not known) and key generation information. The key generation information can consist of the encoder serial number 24 or the seed 20 or both. The key generation information may be used to modify or augment the manufacturer's key stored in the decoder before the new key is calculated. Alternatively, the decoder may not have a manufacturer's key at all, and may derive the decoding key solely from the key generation information transmitted by the encoder, or use that key generation information directly as a decoding key. This information is transferred from the encoder in a learning operation to the decoder.

The key generation information can consist of one or a number of the following elements: a serial number and a seed.

With reference to FIG. 1, the manufacturer's key is stored in the manufacturer's key storage 40. The storage of the manufacturer's key can be performed at the time of manufacturing, if the manufacturer's key is used as input to the key generation algorithm/control 42 to generate a decoding key. During the learning process, the manufacturer's key and the key generation information are used as inputs to the key generation algorithm/control 42 to generate the decoding key that is stored in the key storage 44.

In a further embodiment of the invention, only part of the manufacturer's key need to be stored at the time of manufacturing (for example 32 bits of a 64 bit manufacturer's key). During the learning process, part of the key generation information (for example 32 bits of the seed) is used to augment the incomplete stored manufacturer's key 40 so as to obtain the complete manufacturer's key (64 bits in this example). This newly formed manufacturer's key together with key generation information is used by the key generation algorithm/control 42 to generate the decoding key (64 bits in this example), that is stored in the key storage 44.

The decoder 12 uses the key generation algorithm to generate a key 44 that is used to decode a normal code hopping transmission. The security of this mechanism pertains to the fact that the relationship between the transmitted seed and the decoding key is not known, rendering any kind of interception of the transmission useless. The non-linear key generation function also makes it impossible to establish any relationship between the key and the key generation information, making it impossible for a possible imposter to copy an illegitimate encoder. The key 22, serial number 24 and randomly generated seed 20 of an encoder 10 are loaded during the manufacturing process. The manufacturer generates the key using the seed, serial number, manufacturers master key and key generation algorithm. The key generation algorithm is not made known publicly. Because the seed is a random number, the possibility of manufacturing two encoders with the same keys are very slim. Considering the fact that the serial number is also used in this process, it is highly improbable.

The verification of the learning process is effected as follows. The user presses the appropriate button 48 for normal operation of the encoder 10, thereby causing the transmission of the variable code which is produced by the non-linear encoder 18, and of the serial number held in the storage 24. The newly generated decoder key in the storage 44 is used to decode the incoming code in the decoding algorithm of decoder 34. The management code information which is thereby produced, is used to verify the validity of the decoding operation by comparing it to the management code in the storage 43. The incoming counter information is stored in the relevant storage location 46. An error correction function is included in unit 46 to ensure that if spurious data is stored during a power failure, the correct data can be recovered as soon as power is restored to the decoder.

The user then activates the encoder 10 again. Once more the resulting variable code and the serial number are received by the data transfer interface 13. The variable code is decoded by the decoding algorithm of decoder 34, using the newly generated decoder key. The counter information which results from this transmission is checked against the counter information held in the storage location 46. If the comparison indicates that the two variable code transmissions were successive then it is assumed that the learning process has been valid and the decoder is taken out of the learning mode. The system may now be used for normal operation.

A special relationship exists between the key generation seed in the storage 20 and the user key held in the storage 22. This relationship is dependent on the manufacturer's master key held in the storage 40. The manufacturer's master key is however not programmed into the encoder but, instead, is used in a production line programming unit which programs corresponding key generation seeds and user keys into respective encoders. The manufacturer's master key is, on the other hand, programmed into each decoder and is used during learning, in the manner described, to calculate the correct decoder key, which is then held in the storage location 44, from the received key generation seed.

The calculation of the decoder key may involve augmentation or modification of the manufacturer's key from the key generation information. Alternatively, the decoder may not have a manufacturer's key at all, and may derive the decoding key solely from the key generation information transmitted by the encoder, or use that key generation information directly as a decoding key.

In a further embodiment of the invention, the key generation information may be used as the only input to the key generation algorithm/control 42, and the manufacturer's key storage 40 is not needed. The key generation information may also be used directly as the decoding key by the decoding algorithm 34. In this instance, the key (for instance 64 bits of the key generation information) is stored directly in the key storage 44 as the decoding key during the learning operation.

The key generation algorithm/control 42 can consist of, but is not limited to, a non-linear algorithm that uses two input values to calculate an output value. The two input values are not mathematically related. The output value cannot be used to calculate one or both of the input values of the algorithm, because of the non-linearity of the algorithm. As one of the input values is not known by an intruder, the output value cannot be predicted or calculated correctly if the second input value is not known, making it impossible to simulate or predict a valid input and thus to gain unauthorized access to the system.

In a variation of the learning process the serial number which is held in the storage 24 is used by the key generation unit 42 to generate the decoder key. In this case there is no need for the encoder to have the capability of transferring the key generation seed. Further, a special relationship exists between the serial number and the user key, rather than between the key generation seed and the user key.

The serial number is present in each transmission. Thus the encoder from which a transmission originates can be identified even though an outsider cannot gain access to the information contained in the transmission. The serial number can be used to identify several encoders in a single system making it possible to accommodate several distinct encoders in a single decoder system.

Functional Description

The following description, based on FIGS. 2 to 5 of the accompanying drawings, is made with reference to a practical form of the control system of the invention which embodies the general principles which have been described in connection with FIG. 1. Where applicable similar reference numerals to those employed in FIG. 1 are used in FIGS. 2 to 5 to indicate like components.

Figure 2:
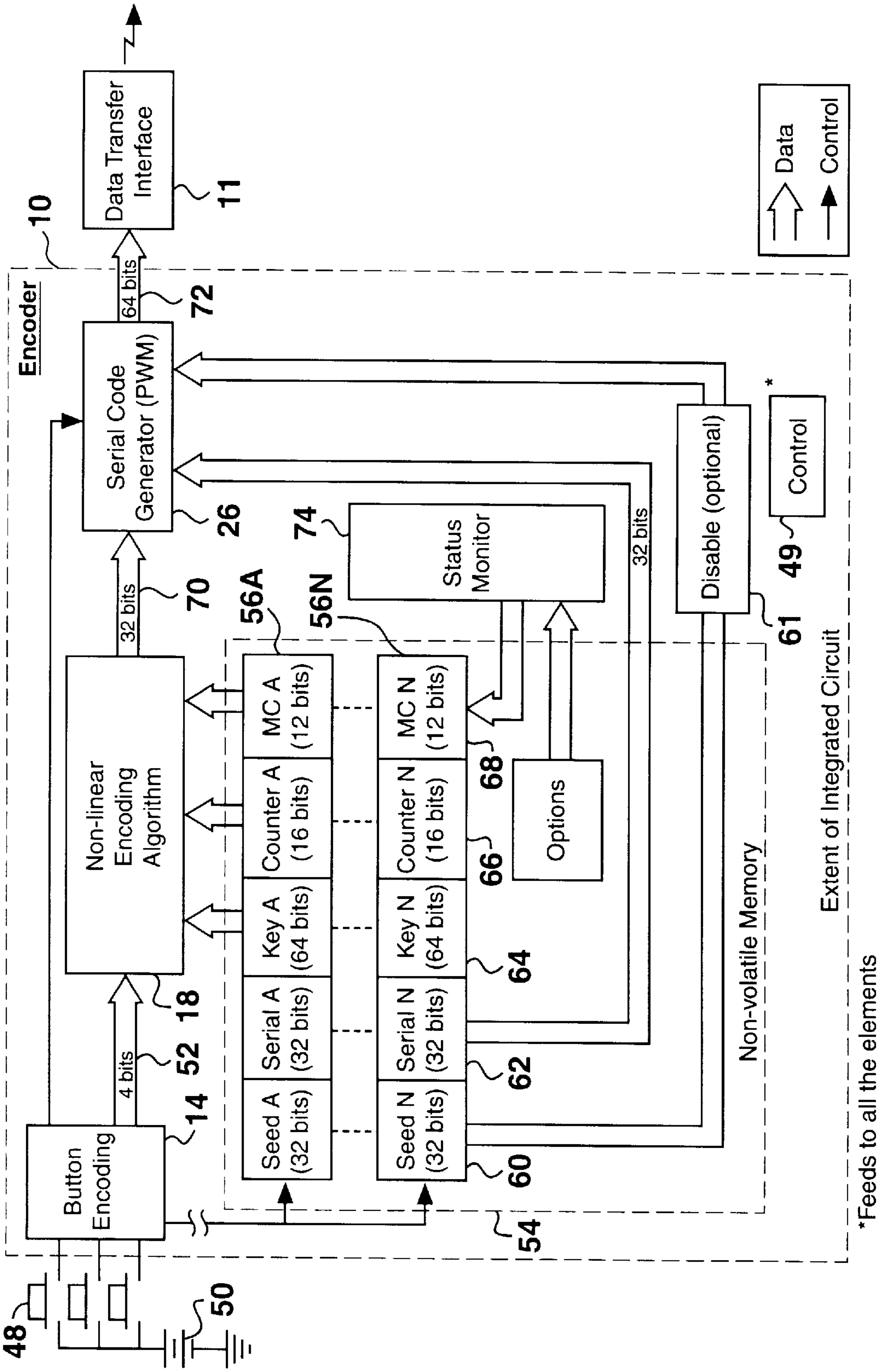
FIG. 2 is a block diagram, in greater detail, of the encoder of FIG. 1.

FIG. 2 depicts an implementation of a code hopping remote control transmitter comprising an encoder 10, buttons 48, a controller 49, a power supply 50 and a data transfer interface 11, which may all be housed in a protective housing, which is fitted with a keyring to enable the user to transport the transmitter conveniently. The buttons 48 may be push button switches, for activation by remote control of the various functions of the security system, and possibly for the supply of power, from the power supply 50, which may be a battery, to the entire transmitter.

All the elements shown in the block diagram, apart from the power supply 50, the button switches 48 and the data transfer interface 11 can be implemented in a single integrated circuit. An application specific integrated circuit is the preferred implementation in order to make reverse engineering as difficult as possible. Reverse engineering poses a security risk in security systems, as full access to algorithms and stored information is provided by this process.

The encoder 10 includes a means 14 (button encoder) for encoding information regarding the buttons 48 which are pressed and outputs encoded information 52 which is used for controlling the operation of the encoder using the controller 49 as well as other parts, and which may be encoded as a "function request" to determine the functions to be activated by the decoder 12. The controlling functions include selecting the mode of operation of the serial code generator 26, and selecting the virtual encoder to be emulated. (The meaning of the phrase "virtual encoder" will become apparent from the following description). A function request can activate one of several outputs on the decoder. A typical application would be in a vehicle security system, where different decoder outputs could be used to disarm an immobilizer, arm an alarm, disarm the alarm and operate electric windows of the vehicle.

As an example of button encoder 14, if an amount of buttons b are used to activate the encoder, the button encoding function encodes the value b to distinguishable values that are passed to the internal circuitry of the encoder. Pressing two buttons at the same time can for instance initiate the generation by the button encoder 14 of a distinguishable value that activates the encoder to transfer encoder related information. If any one of the same two buttons are used separately, a totally different value is generated by the button encoding 14, resulting in the selection and transfer of different information. This means that with an amount of only b buttons, 2 to the power of b different functions can be distinguished and selected. The button encoding 14 can also be used to set the encoder in learning mode by programming the encoding function to output a predetermined value. This value can be presented if any one or combination of buttons are pressed.

A section of non-volatile memory 54 is used to store a plurality of parameter sets 56A . . . 56N. Each parameter set consists of a fixed key generation seed 60 which corresponds to the seed held in the storage 20 of FIG. 1, a serial number 62 which corresponds to the serial number held in the storage 24 of FIG. 1, an encoding or user 20 key 64 which corresponds to the user key held in the storage location 22, counter and error correction information 66 which includes the counter information held in the counter/storage and error correction 16, and a management code 68 corresponding to that held in the storage 17.

As has been noted provision is made for the storage of several parameter sets 56. Each parameter set is associated with what is termed herein a "virtual encoder" for the encoder can act as any one of different virtual encoders, depending on which buttons 48 are pressed.

The counter/storage and error correction 16 is updated each time the encoder is actuated. When several parameter sets are used, however, only the counter information in a particular parameter set is updated each time the corresponding virtual encoder is used.

A specific encoder can either use a single stored parameter set 56 along with various function requests, or different parameter sets with similar or different function requests. Typically, different parameter sets will be used if several different decoders are to be accessed. Several functions 15 might be accessible on each of these decoders. A single encoder might then be configured to access all the decoders, using different parameter sets, and be able to combine different function requests with each of the parameter sets.

The serial number 62 is unique to a particular virtual encoder, and is encoded with each emission from that particular virtual encoder. The encoding or user key 64 is a number, unique to a specific virtual encoder, that is used to encode the transmission in such a way that the original encoded information cannot be retrieved by an outsider. The management code 68 consists of information about the status of the particular virtual encoder, and may include sections with predefined values for checking the integrity of decoding operations in the decoder. The counter and error correction information 66 is the count of a 16 bit counter, used for keeping track of the synchronization between the encoder and the decoder and error corrected if a spurious error occurs during a storage operation. The counter is altered each time the virtual encoder is operated. The key generation seed 60 is a number which, as has been noted with reference to FIG. 1, bears a specific relationship to the encoding key 64. While the key is read protected, the seed 60 is not necessarily inaccessible. However, the relationship between the two is sufficiently obscure that an outsider will not be able to infer the key from the value of the seed.

Means can also be included to permanently disable transmission of the seed 60 after learning has been completed. The disabling means can be activated automatically (e.g. when a predetermined number of transmissions have passed) or by conscious action of the user, including but not limited to, a specific combination of inputs.

In FIG. 2, the disabling means 61 can consist of a physical switch that is either switched on or off by the user to either enable or disable the transmission of key generation information by the encoder 10.

In a further embodiment of the invention, the disabling means 61 can be controlled electronically by the control 49 of the encoder. The disabling means can be activated by the control 49, by sensing the push of one or a combination of buttons 48 by the user. This disabling action makes the encoder more secure by disabling the transmission of key generation information after learning has taken place.

In a further embodiment of the invention, the disabling means 61 can be activated by the value of the counter 66. As soon as the counter reaches a predetermined value, the disabling means is activated by the control 49. In this instance the learning feature of the encoder is disabled automatically after it has been used a number of times.

Any of the above ways may be used to implement the disabling means 61 of the transmission of key generation information by the encoder, but is not limited to any of the above.

The non-volatile memory 54 is read-protected to prevent scrutiny of the encoding keys 64 from outside. Access to the keys, or to the serial number 62, the seed 60 and the manufacturer's master key in the storage 40, could enable an outsider to program a similar encoder with an identical key and gain access to the system.

The encoder includes a non-linear encoder 18 which uses a user key 64 to encode an input string. The key length should be sufficient to ensure reasonable immunity against analytical attacks, considering the state of the art in computer technology. A key length of 64 bits is considered adequate for security and access control systems. The use of longer keys has adverse cost implications, while shorter keys provide reduced security levels. The length of the output string 70 of the non-linear encoding algorithm determines the number of bits encoded by the encoder. A 32 bit output string provides a good balance between security and response time at typical remote control transmission rates. The input string to the encoding algorithm is 32 bits and contains function information 52 from the button encoder 14 (4 bits), the counter information 66 (16 bits) and the management code 68 (12 bits), specific to the encoder being activated. The management code can contain system status information, including low battery voltage indicators and mode selections.

A serial code generator 26 is used to assemble the code to be emitted. The code consists of either a combination of the 32 bit encoded string 70 produced by the non-linear encoder 18 and the serial number 62 of the encoder, or of a fixed key generation seed 60 and the serial number 62. The code generator 26 also implements the modulation scheme required for transmission by the data transfer interface 11 which in this case is pulse width modulation (PWM).

The output 72 of the serial code generator 26 is emitted by the interface 11 using electromagnetic or other means. The data transfer interface 28 can be replaced by a direct connection in the case where remote operation is not required.

The encoder includes a status monitor 74 which can alter parts, for example status information, of the management code 68 in a particular memory block, depending on selected options and conditions existing in the encoder. These changes can be detected in the decoder to provide feedback on imminent encoder problems, for example a flat battery. The status aspects which are monitored are selected via a unit 76.

The options 76 are programmed in the encoder in non-volatile memory to select different encoder status by status monitor 74. A specific predetermined option may indicate for instance battery low voltage. The same value is programmed in the decoder to sense the battery voltage low indication in a transmission for indication to the user. The programmed options 76 are activated, and therefore the selected status monitor 74, when an encoder is activated. The predetermined value is substituted in part of the management code 68 before encoding and transferring the information. The options, when selected and transferred, are sensed by the decoder after decoding so that the programmed action can be taken.

Figure 3:
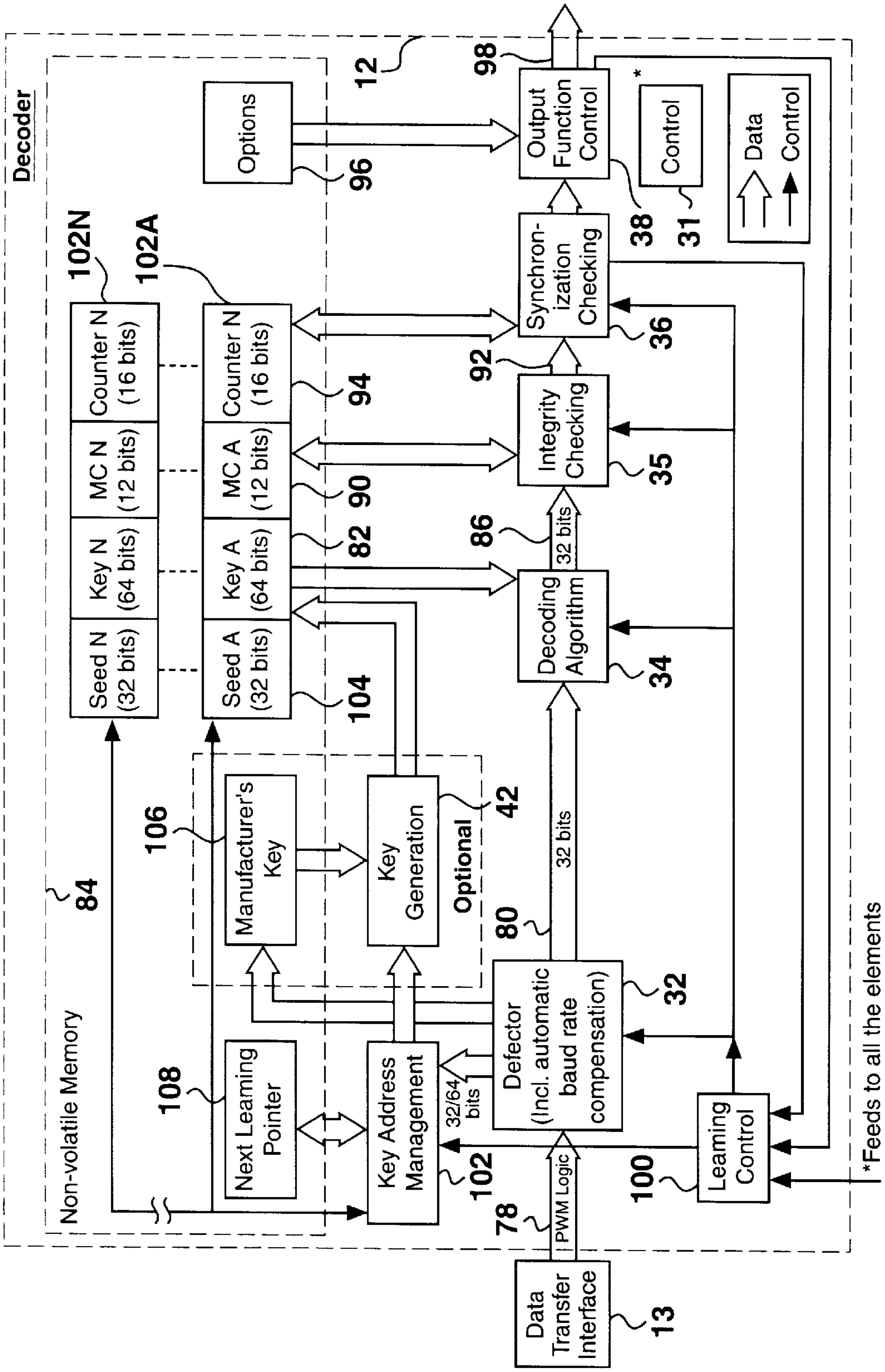
FIG. 3 is a block diagram, in greater detail of the decoder of FIG. 1.

FIG. 3 depicts an implementation of a learning code hopping access control decoder 12.

A data transfer interface 13 converts the electromagnetic or other signals used for transmission of the signal from the data transfer interface 11 into a baseband logic signal 78 still modulated according to the modulation scheme implemented by the serial code generator 26.

The decoder includes a detector 32 which has means for compensating for differences in transmission length due to timing differences between the encoder and the decoder.

The detector 32 extracts a 32 bit variable number 80 from the signal 78 and applies it to a decoding algorithm 34 which decodes the variable number, using a 64 bit decoder key 82 stored in a non-volatile memory 84. If a valid decoding process has taken place the resultant 32 bit code 86 contains the information inserted into the non-linear encoding algorithm of encoder 18 in the encoder 10 before encoding.

The decoder includes an integrity checking unit 35 to verify the validity of the decoding process. For a valid decoding there is a predetermined relationship between a stored management code 90, which corresponds to that held in the storage 43 of FIG. 1, and the corresponding portion of the decoded 32 bit word 86.

The decoder key 82 corresponds to the decoder key held in the storage location 44 of the decoder 12 of FIG. 1.

A synchronization checking unit 36 verifies the validity of a transmission by comparing incoming counter information 92, produced by the integrity checking unit 35, with stored counter information 94 for the relevant encoder. The counter information 94 corresponds to the information held in the storage location 46 of the decoder 12 of FIG. 1 and includes an error correction function to ensure that the value of the counter is corrected when a spurious error is stored during a power failure.

An output management unit 38 manages the activation of or communication with other devices in the system. The unit 38 provides an indication of which of several functions is or are desired, whether the encoder 10 has ceased encoding and whether any special options are being requested. An indication of the identity of the encoder, from which the received signal originated, may also be made available. The unit 38 also makes use of storage space in the non-volatile memory 84 to manage options, determined by an option control unit 96, which may influence the format in which output signals 98, which are produced by the unit, are presented, or may enable or disable specific system features.

A learning control unit 100 manages the learning process by passing appropriate instructions to the detector 32, the decoding algorithm of decoder 34, the integrity checking unit 35, the synchronization checking unit 36 and a key address management unit 102. The unit 100 can be placed into the learning mode from outside the decoder, or special output combinations can be used to place the decoder in the learning mode, by passing the relevant signal from the management control unit 38 to the learning control unit 100. Typically a single memory block is reserved for this purpose. The decoder, including the learning control 100, is controlled by a controller 31.

A parameter set 56 of a designated encoder, referred to as a master encoder, is stored in this reserved memory block. When the master encoder is activated the output function control unit 38 sends a control signal to the unit 100 thereby placing the decoder 12 in the learning mode.

The non-volatile memory 84 makes provision for the storage of a plurality of parameter sets 102A . . . 102N which correspond to the parameter sets 56A . . . 56N in the encoder. Each parameter set includes a serial number 104 which corresponds to the serial number 62 of the corresponding encoder, and the associated decoder key 82, management code 90 and counter information 94. A manufacturer's master key 106, corresponding to the information held in the storage location 40 of FIG. 1, is also stored in the memory 84 for use during learning operations.

An alternative embodiment of the decoder may also include provision to augment or modify the manufacturer's key 40 during learning with part or all of the key generation seed. Alternatively, the decoder may not have a manufacturer's key at all, and may derive the decoding key solely from the key generation information transmitted by the encoder, or use that key generation information directly as a decoding key.

The key address management unit 102 manages the passage of information to and from the non-volatile memory 84. The key address management unit can be implemented in hardware or in software or in a combination thereof. This unit selects the memory bank to be used with each memory bank being capable of storing a single parameter set. A pointer is also maintained in a memory segment 108 indicating the next memory bank to be used for learning operations.

During learning operations a key generation unit 42 generates a decoding key 82 for the new encoder and transfers it to the relevant memory location for the respective parameter set 102. A non-linear encoded algorithm of a similar level of complexity to the code hopping algorithm is used to ensure that the relationship between the key generation seed and the encoding or decoding key 82 is as obscure as possible.

Figure 5:
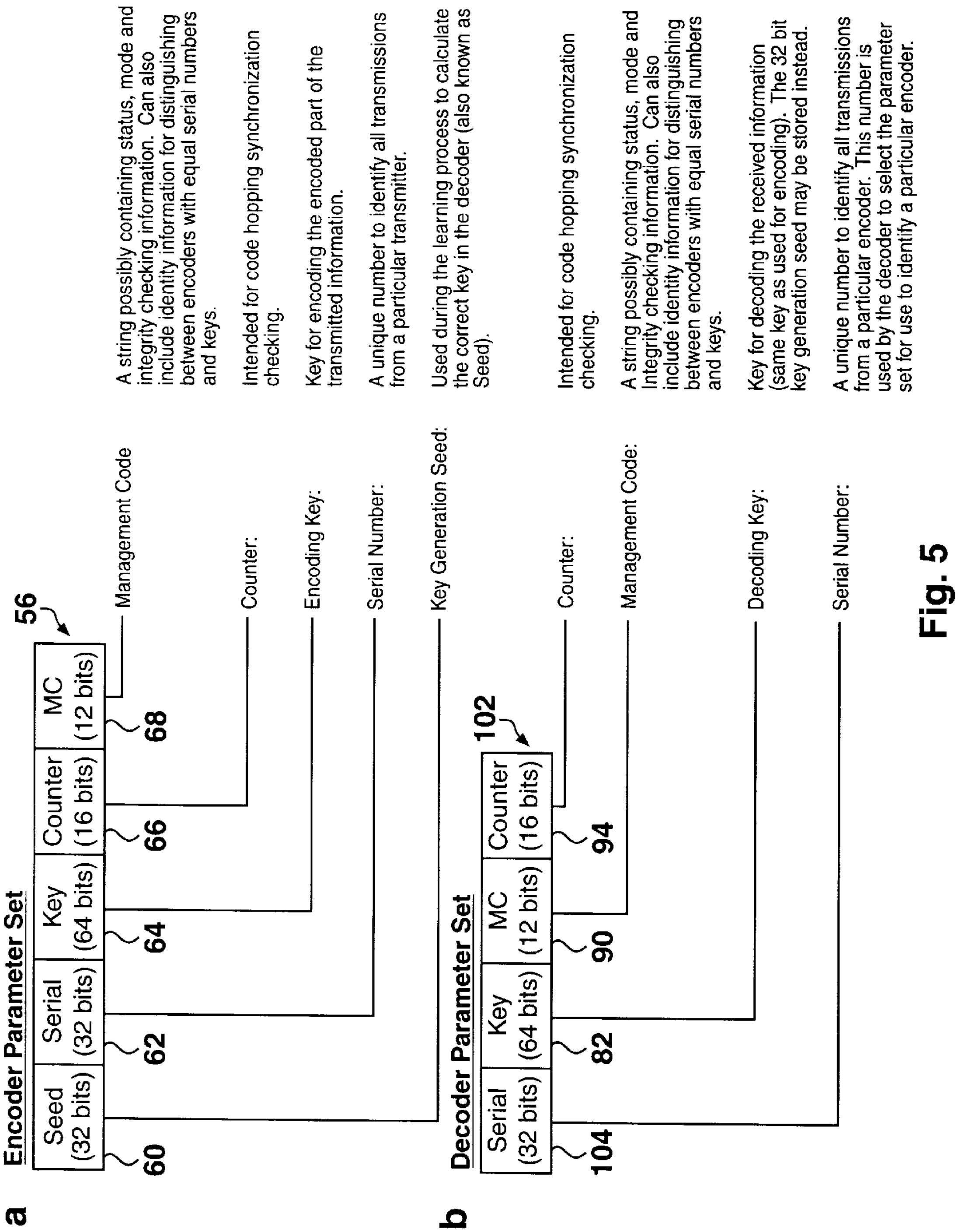
FIGS. 5*a* and 5*b* are diagrams of the storage format of sets of parameters used in the encoder and the decoder of the invention.

FIG. 5 contains a representation of an encoder parameter set 56 and a decoder parameter set 102 and includes a summary of the contents of each parameter set.

Operational Description of the Encoder

When the user presses a button 48 to activate the encoder 10, the button encoding unit 14 determines which button or combination of buttons has been pressed and generates the 4 bit function code 52 together with a combination of control signals. The control signals determine from which memory block the relevant parameter set will be taken and whether the transmission should consist of a hopping code or a fixed code.

The buttons 48 may be replaced by a system that can command the encoder electrically. The command can be generated, for instance, by a computer or other equipment, using a special command interface. The power of the encoder may also be supplied by the command interface.

In another application the encoder and decoder combination can be used for authentication and access control purposes. The encoder can be housed in a token or smart card that a person can carry and use to access, for instance, a security area. The communication takes place on an electrical interface. In this case bidirectional communication is used to communicate information between an encoder and a decoder. The serial number 62 of the encoder is transferred to the decoder to establish the key 82 to be used in the decoding process. A value is presented as an input value to the encoder by the decoder, known as a challenge. The encoder encodes the challenge value and returns the encoded value to the decoder. The decoder now decodes the encoded value and compares it with the challenge value to establish the authenticity of the encoder and activate an output accordingly. This technique is generally known as IFF (identification friend or foe). In this application, the seed 60 of the encoder can be transferred to a decoder in learning mode. The key 82 can be generated and stored in the decoder as described in this description.

The ability to employ more than one parameter set for an encoder enables the encoder to address more than one decoder without interference, even if a single operating frequency is shared. The encoder appears to be a chosen one of several independent encoders, each of which is capable of independent operation, hence the phrase "virtual encoder". Clearly the encoders are not capable of simultaneous operation. For hopping code operation the non-linear encoding algorithm of encoder 18 uses the respective encoding key 64 to encode the counter information 66 and the management code 68 together with the 4 bit function code 52. The 32 bit output code 70 is presented to the serial code generator 26. The counter information 66 is altered each time a transmission takes place for the respective virtual encoder. The serial code generator 26 appends the relevant encoder's serial number 62 to the encoded part thereby forming a single output code 72 which is presented to the input of the data transfer interface 11 in PWM serial form (in this example).

For fixed code operation the key generation seed 60 is presented directly to the serial code generator 26 which presents the code, together with the serial number 62, in PWM serial form to the data transfer interface 11.

Means can also be included to permanently disable transmission of the seed 60 after learning has been completed. The disabling means can be activated automatically (e.g. when the encoder has been used for a predetermined number of transmissions) or by a conscious action of the user including, but not limited to, a specific combination of inputs. The disabling means may take on any suitable form and may be a switch 61, activated as described, which interrupts data flow from the seed 60 to the generator 26. Alternatively, the control 49, in response to a manual or other input, can be used to inhibit data transfer from the seed to the generator 26. The control could also be used to activate the switch 61.

In both modes of operation the data transfer interface 11 transmits the information from the serial code generator using electromagnetic or other means.

Operational Description—Decoder Normal Operation

Signals received by the data transfer interface 13 are converted to the logic signal 78, still in PWM form. The format detector 32 monitors the logic signal 78 and when the initial portion of an apparently valid signal is observed the detector calibrates itself on the incoming signal to compensate for deviations from nominal timing. The remainder of the incoming signal is received and converted to a number which, in this example, is a 64 bit binary number.

The first 32 bits of the detector output, i.e., the hopping code, are designated 80 and are presented to the decoding algorithm of decoder 34. The last 32 bits, i.e., the serial number, are presented to the key address management unit 102. This unit determines the memory block to be used by comparing the received serial number with the stored serial numbers 104 until a match is found. The decoding algorithm 34 uses the decoder key 82 from the correct memory block, i.e., the respective parameter set, to decode the hopping code 80. A 32 bit output 86 is presented to the integrity checking unit 35. This 32 bit string comprises the original 4 bit function code 52, 16 bits of counter information 66 and the 12 bit management code 68. The integrity checking unit 35 checks for a predetermined relationship between the decoded management code 68, in the decoded word 86 and the stored version 90. If a defined relationship exists the decoding is held to have been valid.

The decoded counter 66 is compared with the stored counter 94 held in the respective parameter set. If the synchronization proves that the transmission is valid the stored value 94 is updated and the output control function unit 38 is advised accordingly.

The unit 38 outputs the decoded function information 98. The unit may make the information available in serial format for use by an external controller or may have discrete outputs to indicate any of a number of different conditions. The identity of the encoder being decoded that can be included as part of the management code, a valid signal indicator, and a second function mode, are all examples of useful output information 98.

Operational Description—Decoder Learning Operation

Learning operation takes place when the user wishes to add a new encoder to the system. The learning control unit 100 then receives an input signal prompting it to enter the learning mode, for example, by activating switch 110. The signal may be in the form of an instruction from outside, e.g., generated by a switch or may emanate from the output function control unit 38 after reception of a valid code, as has been described hereinbefore.

The user now activates the encoder 10 as a fixed code encoder using a specific learning hardware configuration. The key generation seed 60 is substituted for the variable code portion of the transmission and the serial number 62 is retained as the remainder of the encoded code.

The resultant signal, emitted by the data transfer interface 11, is received by the data transfer interface 13. The format detector 32 passes the entire received transmission 78 to the key address management unit 102. Thus the signal presented to the unit 102 is a 64 bit string. The unit 102 deviates from its normal functioning in the learning mode and generates an decoding key 82 from the serial number, the key generation seed and the manufacturer's master key 106. This key is written into one of the memory blocks depending on the value of a pointer used specifically for this purpose and held in the memory block 108. The received serial number 104 is stored in the relevant memory block associated with the respective parameter set. The next learning pointer can be managed according to a variety of different schemes. Options include, inter alia, cycling the pointer through the available memory locations and allowing the user to set the pointer from outside.

From a security point of view a key generation algorithm, of the kind carried out by the unit 42, should only be implemented in an application specific integrated circuit as a generic logic device, such as a micro processor, is readily reverse engineered, leaving the algorithm open to public scrutiny.

The user now activates the encoder twice in the code hopping mode. During the first transmission the 64 bit code is received by the data transfer interface 13 and detected by the detector 32. The decoding algorithm of decoder 34 decodes the 32 bit variable code 80 using the newly generated decoder key 82 and stores the decoded management code 90 in the correct location. The decoded counter information 94 is also stored in the correct location.

During the second transmission the received signal is detected by the detector 32 and the serial number is passed to the key address management unit 102 where it is compared with the newly stored serial number 104. In addition the 32 bit variable code 80 is decoded by the decoding algorithm 34. The integrity checking unit 35 checks the decoded management code against the stored version 90 and the synchronization checking unit 36 checks the decoded counter information against the stored version 94. If any of these checks is unsuccessful the learning operation is rejected. If they are all successful the next learning pointer in the storage location 108 is altered to indicate that the next memory block is available for learning.

The learning process may also include a routine to learn a specific combination of outputs for use with a specific encoder. For example a specific user may require special priority in a specific system and this priority can be assigned during such a routine.

Once the entire learning operation has been successfully concluded the user should activate the encoder once more to verify that the encoder is operating correctly.

Encoder Operation—Alternative Key Management Scheme

The system as it has been described makes use of stored keys 82 in the decoder to decode incoming transmission. An alternative arrangement for learning systems is to store only the key generation seed, instead of the full key, in the location allocated for the key 82. During decoding operations the correct key is generated from the associated key generation seed and the manufacturer's master key 106. The advantage is that less non-volatile storage space is required as the key generation seed typically requires less storage space than the key. The correct key is generated in RAM whenever needed.

Learning Algorithm

Figure 4A:
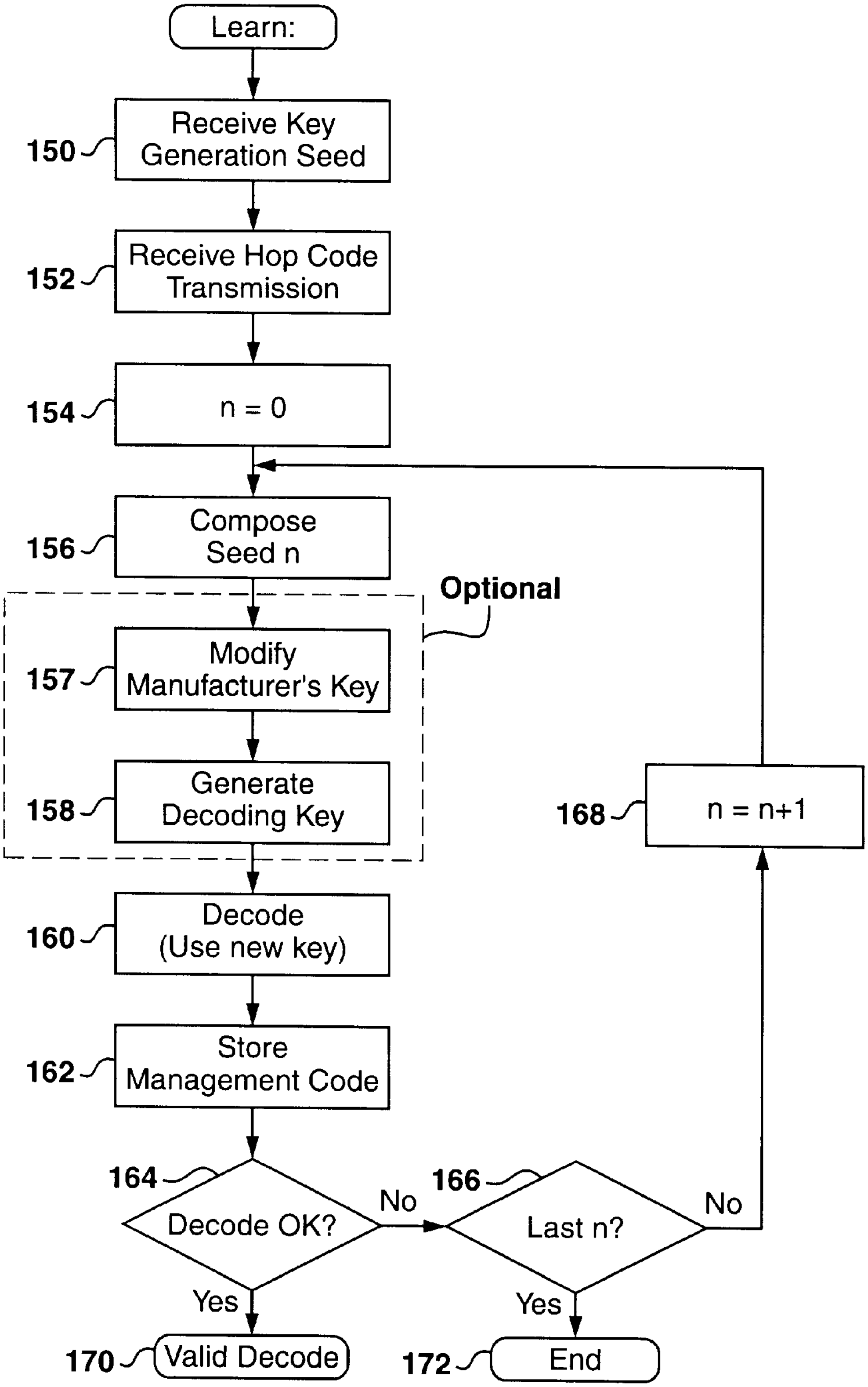
FIGS. 4*a* and 4*b* are flow charts of the operation of a learning algorithm embodied in the system of the invention.
Figure 4B:
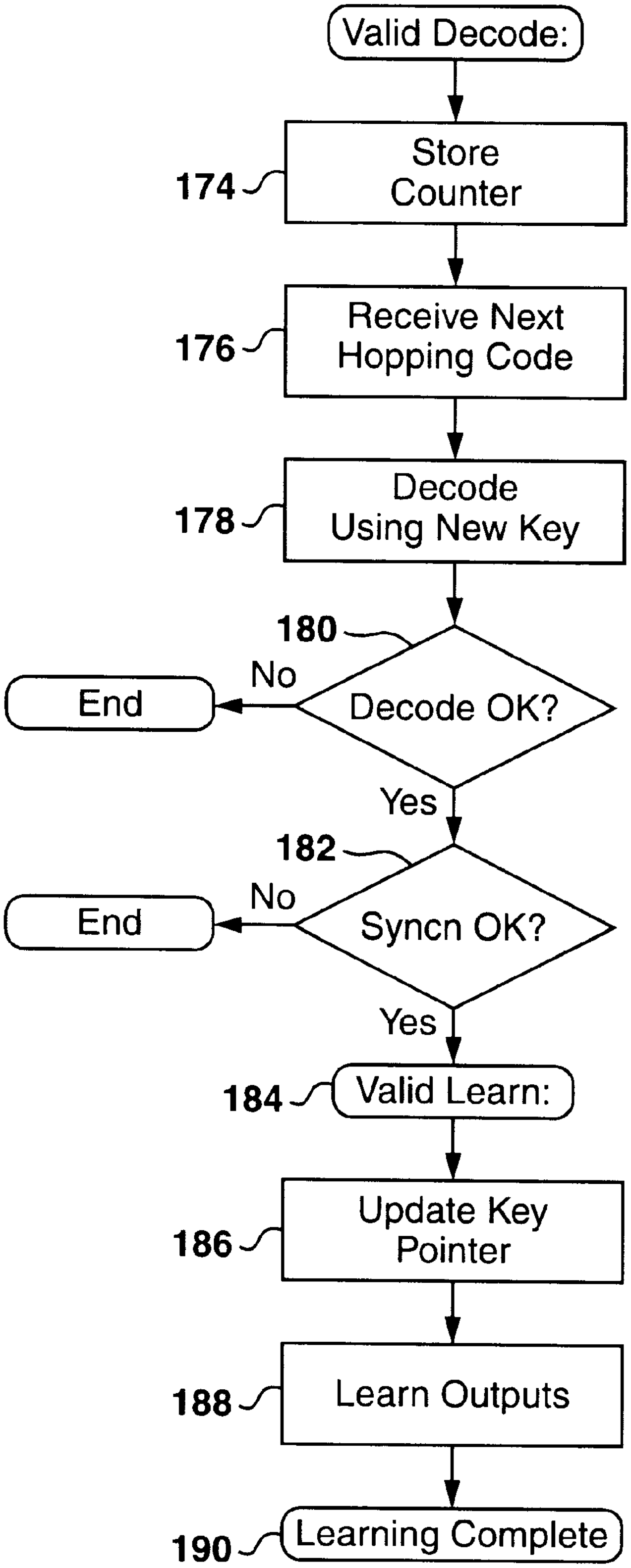

FIGS. 4*a* and 4*b* are flow charts of the learning algorithm embodied in the decoder. Referring to FIG. 4*a*, once the learning mode has been established as described previously, the key generation seed (stage 150) and the hopping code (stage 152) are received by the decoder. At a stage 154 a relational counter (in key generation unit 42) is initialized, and set to zero. The relational counter is used to allow for more than one relationship between the key generation seed, the encoder serial number and the key for the encoder, or between the encoder serial number and the key for the encoder.

The relational counter 154 is used at a stage 156 to compose a modified seed for the key generation algorithm which is a non-linear algorithm using at least the manufacturer's master key 106 and the key generation seed as an input. As an option to this method, the manufacturer's key 106 can be modified (stage 157) before the new decoding key is generated (stage 158). As a further option, these two stages can both be considered as optional as indicated in FIG. 4*a*. In this instance either the decoding key of the key generation information (consisting of seed and serial number) can be stored directly. In the last case the decoding key is generated during the receipt of encoded information. After the key is generated (stage 158), the management code can be decoded and stored (stage 162). The decoding operation integrity is checked at stage 164 to decide if the decoding operation is valid. If valid, the flow proceeds to stage 170. If it is not valid, it is decided if the operation should carry on or not at stage 166. If the operation should carry on, the relational counter 154 is incremented (stage 168) to establish a new relationship that may be valid.

The learning process terminates at a stage 172 if all valid relationships between the key generation seed and the serial number have been used and a valid relationship (stage 166) has not been found.

The probability of accidentally accepting an invalid encoder during learning is related to the number of predefined bits within the encoded management code. Since not more than 12 bits are available in the implementation under discussion the best integrity is in the order of 1 in 4000. This level is regarded as inadequate for security systems. The integrity can be improved either by increasing the length of the known component of the management code or by implementing a checking algorithm based on a second transmission (stage 176 in FIG. 4*b*) from the encoder being learned. Longer code lengths have disadvantages such as higher implementation cost and longer response times. Using a second transmission increases the certainty of the integrity checking by many orders of magnitude without affecting the system cost or the response time.

The second part of the flow chart implements this technique, as described with reference to FIG. 4*b*. If the decoding function is performed and found valid (stage 170), a decoded counter value is stored (stage 174). At stage 176 a second hopping code is received. This code is decoded (stage 178) and the decoded management code verified (stage 180) with the stored management code. If the values do not match the learning process is accepted as invalid and aborted. Next, the counter value is verified at stage 182 with the stored counter value. If the values do not match, the transmission is accepted as an invalid and illegitimate learn operation, and aborted. If the counter values match, a valid learn operation accepted (stage 184). If the counters do not match, as with normal code hopping system operations, some leeway may be allowed in the counter synchronization checking (stage 182) to allow for interim transmissions that may not have been decoded by the decoder, and can be accepted as if they match and accepted as valid.

At stage 184 it is assumed that a valid learning process has been completed. The next learning pointer (reference 108 in FIG. 3) is updated at stage 186 to point to the next available learning position. Output configuration learning associated with a particular encoder can be included at stage 188 if required. At stage 190 the learning cycle is completed.

Obviously, numerous modifications and variations of the present invention are possible in light of the above teachings. For example, the encoder part 10 is implemented on an application specific integrated circuit (ASIC). Part of the circuit is made up of non-volatile memory that is used to store the different changing and programmable values, such as the parameter sets 56 and options 76. Although this method of implementation is used to ensure the security and practical aspects of the system, it can be implemented in software in a computer or a microprocessor controller. The same approach is used with the decoder 12. The functions and memory parts are implemented on an ASIC, but can also be implemented on a computer or microprocessor controller. This implementation may be preferable at the decoder, as the decoder may be required to store a large amount of information to allow many users to access the system. It is therefore understood that within the scope of the appended claims, the invention may be practiced otherwise than as specifically described herein.

What is claimed as new and desired to be secured by Letters: Patent of the United States is:

1. A method of determining a key to be used for encrypting and decrypting information transmitted between two stations, comprising the steps of:

storing a key in a first station during manufacturing, the key being generated using first information not used by said first station, second information, and a key generation routine;

storing the key generation routine and the first information in a second station during manufacturing;

transmitting the second information from the first station to the second station during learning;

receiving the second information by the second station during learning;

calculating, during learning, a key in the second station using the second information which has been received, the first information which has been stored in said second station during manufacturing, and the key generation routine; and selectively stopping transmitting the second information.

2. A method as recited in claim 1, wherein the step of selectively stopping comprises:

permanently stopping transmitting the second information.

3. A method as recited in claim 1, wherein the step of selectively stopping comprises:

stopping transmitting the second information after the second information is transmitted a predetermined number of times.

4. A method as recited in claim 3, wherein the step of selectively stopping comprises:

permanently stopping transmitting the second information.

5. A method as recited in claim 1, wherein:

said second station is a remote encoder device; and the step of selectively stopping comprises activating a command to stop the transmitting of the second information.

6. A method as recited in claim 5, comprising:

activating the command to permanently stop the transmitting of the second information.

7. A method according to claim 1, wherein:

the first station is a transmitter and operates during the learning without performing a step of receiving information from the second station.

8. A method according to claim 7, wherein:

the second station is a receiver and operates during the learning without performing a step of transmitting to the first station.

9. A method according to claim 1, comprising:

storing in said first station the second information which is a serial number, wherein the step of transmitting the second information comprises transmitting the second information which is the serial number.

10. A method according to claim 1, comprising:

storing in said first station the second information which is a seed, and wherein the step of transmitting the second information comprises transmitting the second information which is the seed.

11. A method according to claim 1, comprising:

storing in said first station the second information which is a randomly generated seed, and wherein the step of transmitting the second information comprises transmitting the second information which is the randomly generated seed.

12. A method according to claim 1, comprising:

storing in said first station the second information which is information derived from applying the key and an algorithm to an input value, and wherein the step of transmitting the second information comprises transmitting the second information which is the information derived from applying the key and the algorithm to an input value.

13. A method according to claim 1, wherein:

the step of storing the first information in the second station during manufacturing comprises storing the first information which is a manufacturer's master key; and the step of calculating the key in the second station uses the first information which is the manufacturer's master key.

14. A method according to claim 1, further comprising the step of:

storing the second information during manufacturing;

storing third information, in the first station, which is different from the second information, wherein the step of transmitting the second information further comprises transmitting the third information from the first station to the second station during learning, and wherein the step of receiving the second information comprises receiving and storing the third information during learning.

15. A method according to claim 14, further comprising, performed after the step of calculating the key in the second station, the steps of:

encoding information by the first station using the key stored therein;

the first station is a transmitter and operates during the learning without receiving information from the second station.

16. A method according to claim 14, further comprising the steps of:

comparing the third information which has been received with management information; and verifying a validity of the third information when the comparing step determines that the information which has been received corresponds to the management information.

17. A method according to claim 1, further comprising the step of:

transmitting counter information from the first station to the second station, after the step of transmitting the second information;

receiving the counter information by the second station;

comparing the counter information which has been received with counter information which has been previously stored in the second station; and prohibiting the execution of a command by the second station when the counter information which has been received is not successive to the counter information which has been previously stored.

18. A system for determining a key to be used for encrypting and decrypting information transmitted between two stations, comprising:

a memory which stores a key in a first station during manufacturing, the key being generated using first information not used by said first station, second information, and a key generation routine;

a memory which stores a key generation routine and the first information in a second station during manufacturing;

means for transmitting the second information from first station to the second station during learning;

means for receiving the second information by the second station during learning;

means for calculating, during learning, a key in the second station using the second information which has been received, the first information which has been stored during manufacturing in said second station, and the key generation routine; and means for selectively stopping transmission of the second information after a successful learning operation.

19. A system according to claim 18, wherein:

the first station is a transmitter and operates during the learning without receiving information from the second station.

20. A system according to claim 19, wherein:

the second station is a receiver and operates during the learning without transmitting to the first station.

21. A system according to claim 18, comprising:

a memory storing the second information which is a serial number, and the means for transmitting the second information comprises means for transmitting the second information which is the serial number.

22. A system according to claim 18, comprising:

a memory storing the second information which is a seed, and the means for transmitting the second information comprises means for transmitting the second information which is the seed.

23. A system according to claim 18, comprising:

a memory storing the second information which is a randomly generated seed, and the means for transmitting the second information comprises means for transmitting the second information which is the randomly generated seed.

24. A system according to claim 18, comprising:

a memory storing the second information which is information derived from applying the key and an algorithm to an input value, and the means for transmitting the second information comprises transmitting the second information which is the information derived from applying the key and an algorithm to an input value.

25. A system according to claim 18, wherein:

the memory which stores the first information in the second station during manufacturing stores the first information which is a manufacturer's master key; and the means for calculating the key in the second station uses the first information which is the manufacturer's master key.

26. A system according to claim 18, further comprising:

a memory, in the first station, which stores third information which is different from the second information stored during manufacturing, wherein the means for transmitting the second information further comprises means for transmitting the third information from the first station to the second station during learning, and wherein the means for receiving the second information comprises means for receiving and a memory which stores the third information during learning.

27. A system according to claim 26, further comprising:

means for encoding information by the first station using the key stored therein;

means for transmitting the third information and the information encoded by the first station;

means for receiving, by the second station, the third information and the information encoded by the first station;

means for comparing, by the second station, the third information which was transmitted with the information encoded by the first station with the third information stored during learning;

means for decoding, by the second station, the encoded information; and means for executing a function which corresponds to the encoded information which has been decoded, only when the means for comparing determines that the third information which was transmitted with the information encoded by the first station corresponds to the third information stored during learning.

28. A system according to claim 26, further comprising:

means for comparing the third information which has been received with management information; and means for verifying a validity of the third information when the means for comparing determines that the information which has been received corresponds to the management information.

29. A system according to claim 18, further comprising:

means for transmitting counter information from the first station to the second station, after transmitting the second information;

means for receiving the counter information by the second station;

means for comparing the counter information which has been received with counter information which has been previously stored in the second station; and means for prohibiting the execution of a command by the second station when the counter information which has been received is not successive to the counter information which has been previously stored.

30. A system as recited in claim 18, wherein the means for selectively stopping comprises:

means for permanently stopping transmitting the second information.

31. A system as recited in claim 30, wherein the means for selectively stopping comprises one of:

a switch, a switch and a counter, and a controller, counter and switch.

32. A system as recited in claim 18, wherein the means for selective stopping comprises:

means for stopping transmitting the second information after the second information is transmitted a predetermined number of times.

33. A system as recited in claim 32, wherein the means for selectively stopping comprises:

means for permanently stopping transmitting the second information.

34. A method as recited in claim 18, wherein:

said second station is a remote encoder device; and the means for selectively stopping comprises means for activating a command to stop the transmitting of the second information.

35. A system as recited in claim 34, comprising:

means for activating the command to permanently stop the transmitting of the second information.

36. A system as recited in claim 35, wherein the means for selectively stopping comprises one of:

a switch, a switch and a counter, and a controller, counter and switch.

* * * * *